United States Patent Office
3,629,427
Patented Dec. 21, 1971

1

3,629,427
ANTI-BACTERIAL AND ANTI-FUNGAL
TREATMENT WITH SULFOXIDES
Herbert Q. Smith, Malvern, Pa., assignor to Pennwalt
Chemicals Corporation, Philadelphia, Pa.
No Drawing. Filed Feb. 6, 1969, Ser. No. 797,244
Int. Cl. A01n 9/12
U.S. Cl. 424—270       10 Claims

ABSTRACT OF THE DISCLOSURE

Process of controlling bacteria and fungi with compounds of the structure

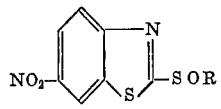

where R is an alkyl group containing from 1 to 4 carbon atoms.

---

This invention relates to anti-bacterial and anti-fungal compositions and to the process of using them, and is particularly concerned with the use as the active agent an alkyl benzothiazolyl sulfoxide having the structure

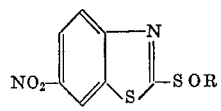

where R is an alkyl group containing from 1 to 4 carbon atoms.

The above described benzothiazolyl sulfoxides are prepared from the corresponding 2-mercaptobenzothiazoles which are S-alkylated and oxidized to the sulfoxide. Such techniques are known in the art and particular reference is made to Todesco and Vivarelli, Boll. Sci. Fac. Chem. Inc. Bologna 20 (3–4), 125 (1962); C.A. 59 8562 gh. The compounds are used in accordance with the usual procedures where bacteriostatic, bactericidal, fungistatic, and fungicidal activity against plant and human pathogens is desired, but the invention will preferably be used for treating seeds, plants, and fruits to prevent or control attack by fungi. One of the advantages of the compounds described above is that they may be used under controlling conditions without being toxic to the treated plants. The compounds will be useful in controlling numerous fungi affecting fruits, vegetables and crop plants, late blight, damping-off, apple scab, and other fruit diseases, rusts, bacterial plant diseases, etc.

The procedure which will be used for applying the compositions of the invention to plants will be in accord with the usual practices known in the art. Since the active compounds have limited water solubility they will usually be applied to the plant as an aqueous dispersion, which is preferably obtained from a wettable powder. In a preferred embodiment of the invention a concentrate of the active agent together with a carrier and containing a surfactant will be manufactured and sold as an article of commerce. Preferably this concentrate will be in the form of a wettable powder made simply by blending the active agent with a carrier such as clay or other finely-divided or particulate inert matter, e.g., attapulgite, bentonite, fuller's earth, and the like. As a surfactant there may be used one or more of the many surface active agents generally employed such as a polyalkylene oxide a lignin sulfonate, or the various other cationic, anionic and nonionic surfactants available for such purposes. Generally, the wettable powder concentrate will contain from about 5 to about 90% by weight of the active agent, the balance being the carrier and the surfactant.

2

Alternatively, the active agents may be formulated in organic solvent systems as a solution or emulsion concentrate containing from 5 to about 90% by weight of active agent and the organic solvent system dispersed in water just prior to use. Generally, the organic material will be an organic hydrocarbon solvent such as xylene, toluene, etc., but other solvent systems such as ketones (methyl ethyl ketone, acetone, etc.) aliphatic amides such as dimethylformamide, dimethylacetamide, ketoalcohols (diacetone alcohol) and the like may also be used.

The rate of application of the fungicides onto the plant, flower, seed or other crops to be treated will vary from about 0.25 lb./100 gallons to 10 lbs./100 gallons of active material. Preferably, and for economic reasons, the rate of application will be from 0.25 lb. to 3 lbs. per acre or from 0.25 lb. to 2 lbs. per gallon for tree applications. Application is made in the usual manner by spraying an aqueous dispersion of the agent onto the plant and treatment in this manner enables control of the pathogen to be obtained.

It is surprising that the sulfoxides described above have fungicidal activity since the unsubstituted 2-alkyl sulfinyl benzothiazolyl e.g.,

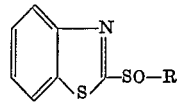

is inactive. In fact, even if the nitro group in the active agent of the invention is replaced with an alkoxy group (e.g., ethoxy) no significant fungicidal activity is found. Likewise, 5- and 6-positioned chloro derivatives show little activity. Thus, it is seen that the active fungicides of the invention are highly dependent upon their specific structure.

In order to more fully illustrate the invention the following examples are given:

EXAMPLE 1.—FORMULATIONS OF ACTIVE
AGENT (a) Aqueous dispersion

Ten parts by weight of 2-propylsulfinyl-6-nitro-benzothiazole and 90 parts by weight of water are ball milled in the presence of an alkyl urea polyether alcohol surfactant until a stable dispersion is obtained.

(b) Wettable powder

Ingredients:                                  Percent by weight
  2-ethylsulfinyl-6-nitrobenzothiazole _____ 50
Surfactants:
  Sodium lignosulfonate ("Marasperse" N) _____ 2
  Alkylphenoxypoly(ethyleneoxyethanol)
    ("Igepal" RC–760) _____ 2
Carrier:
  Attapulgite _____ 46

EXAMPLE 2.—ACTIVITY AGAINST POWDERY
MILDEW

Pinto bean plants in pots are sprayed with water emulsion of 2-butylsulfinyl-6-nitrobenzothiazole to deposit the agent at various concentrations. Powdery mildew (erysiphe polygoni) cultures maintained on other plants are then used to inoculate the treated plants. Percent control is obtained by visual comparisons with a check test using none of the active agent. In this test 2-butylsulfinyl-6-nitrobenzothiazole gives 100% control at 1000 p.p.m.

EXAMPLE 3.—ACTIVITY AGAINST LATE BLIGHT

Three to four week old Bonnie Best tomato seedlings are sprayed with a water emulsion of the active agent and inoculated (after drying) with a suspension of zoospores (produced from sproangia from lima bean agar cultures of Phytophthora infestans). Counts are made of spots of late blight infection when they appear and control is expressed as percentage of check.

The following table indicates the data and results of the tests:

TABLE B

| Agent | Concentration (p.p.m.) | Percent control of late blight |
|---|---|---|
| $NO_2$-benzothiazole-$SO-CH_3$ | 1,000 / 200 / 40 | 99 / 97 / 93 |
| $NO_2$-benzothiazole-$SO-C_4H_9$ | 200 / 40 | 43 / 80 |
| $C_2H_5O$-benzothiazole-$SO-CH_3$ | 1,000 / 200 / 40 | 2 / 9 / 0 |
| Cl-benzothiazole-$SO-CH_3$ | 1,000 | 73 |
| Cl-benzothiazole-$SO-CH_3$ | 1,000 / 200 | 53 / 40 |

EXAMPLE 4.—SPORE GERMINATION ACTIVITY

Spores of Monilinia fructicala, Alternaria brassicide, and Glomerolla cingulata from agar cultures and active agent are mixed together in a drop of water contained in wax rings on 1 x 3 inch glass slides. Evaluation is made by determination at what concentration germination occurs after 24 hours at 18° to 20° C. and the ratings follow:

3+=none at 1 p.p.m.; 3=1 to 10 p.p.m.; 2=10 to 100 p.p.m.; 1=100 to 1,000 p.p.m.; 0=1,000 p.p.m.

Results are shown in the following table:

TABLE C

| Agent: | Rating |
|---|---|
| 2-methylsulfinyl-6-nitrobenzothiazole | 3 |
| 2-butylsulfinyl-6-nitrobenzothiazole | 3 |
| 2-methylsulfinyl-6-ethoxybenzothiazole | 1 |

EXAMPLE 5.—APPLE SCAB CONTROL

Six month to one year old actively growing apple seedlings are sprayed on both top and bottom leaf surfaces at the appropriate concentrations of active agents in a 25% wettable powder formulation. The plants are allowed to dry for four hours and placed in a moist chamber for 12 hours to simulate weathering. Spores of apple scab (Venturia inaequalis) are atomized from an aqueous suspension onto the tops and bottoms of the apple tree leaves and held in the moist chamber at 20° C. for 36 to 48 hours. Counts are made on three leaves per plant with scab and control expressed as percent of check.

TABLE I

| Agent | Concentration | Apple scab control |
|---|---|---|
| 2-methylsulfinyl-6-nitrobenzothiazole | 1,000 | 72 |
| Do | 200 | 40 |
| 2-butylsulfinyl-6-nitrobenzothiazole | 1,000 | 66 |
| Do | 200 | 24 |
| "Captan"-N-trichloromethylmercapto-4-cyclohexene-1,2-dicarboximide [1] | 1,000 | 15 |
| Do | 200 | 5 |

[1] A commercial fungicide for foliage of fruit trees.

EXAMPLE 6.—CONTROL OF WHEAT RUST

The formulated agent is diluted with distilled water to obtain the desired concentrations and six-day old potted Seneca wheat plants are sprayed with an atomizer to apply the test agent. Ten ml. of diluted compound is used to treat each pot.

Urediospores of Puccinia rocondita are washed from previously infected leaves with distilled water containing 125 p.p.m. Ivory soap. This spore suspension is placed in a small vial and the capped vial is placed on a ball mill. After one hour the liquid is removed from the washed spore and soap powder is added to obtain a spore suspension of 100,0000 spores per ml.

After the treated plants have dried, about 50 ml. of the spore suspension is used to spray inoculate every ten pots. Immediately after inoculation the plants are placed in a high humidity chamber at 15° C. After 24 hours the plants are removed and held at room temperature for six days when infection readings are made.

In accord with the above procedure 2-methylsulfinyl-6-nitrobenzothiazole showed 90% control of wheat rust at 500 p.p.m.

EXAMPLE 7

The active agents as described by the above formulae are evluated and found active against numerous bacteria and fungi pathogenic to humans; e.g. Bacillus subtilis, Staphylococcus aureus, Escherichia coli, Staphylococcus typhosa, Salmonella typhosa, Staphylococcus epidermidas, and Candida albicans. The following test procedures and data illustrate this activity:

(I) Agar dilution method

One-half of the area of the petri dish is covered with agar which contains the germicide at a selected concentration, whereas the other half is covered with an untreated agar. Both the treated and untreated agars are then seeded wtih bacteria or fungi by streaking across the plate. After 48 hours of incubation the plates are examined for any exhibited inhibitory properties of biostatic agents against test bacteria or test fungi. The test data with 2-methylsulfinyl-6-nitrobenzothiazole follows:

| | Concentration, p.p.m. | Staphylococcus aureus (ATCC No. 6538) | Escherichia coli (ATCC No. 11229) |
|---|---|---|---|
| | 1 | +4 | +4 |
| | 10 | +3 | +4 |
| | 20 | +3 | +4 |
| | 25 | 0 | ± |
| | 50 | 0 | 0 |
| | 100 | 0 | 0 |
| | 300 | 0 | 0 |
| | 500 | 0 | 0 |
| Endpoint, p.p.m. | | 25 | >25 |
| Acetone control | 25 | +4 | +4 |
| | 50 | +4 | +4 |
| | 100 | +4 | +4 |
| | 500 | +4 | +4 |
| | 1,000 | +4 | +4 |

NOTE.—0=No growth; ±=trace growth; 1 to 4 indicates increasing amounts of growth.

(II) Minimal inhibitory concentration

Using the tube dilution method against Candida albicans, three-fold dilutions are used from 33 to 0.033 mcg./ml. to determine the minimal inhibitory concentration of 2-methylsulfinyl-6-nitrobenzothiazole. Tubes were read after 24 and 72 hours incubation. At 1.0 mcg./ml. no growth was observed at 24 hours, but growth began in 72 hours. This activity is comparable to that of Nystatin, a commercial fungicide. Upon subculturing the maximal concentration it was found that the minimal inhibitory concentration was 3.3 mcg./ml. and was cidal in nature.

EXAMPLE 8.—AOAC FUNGICIDAL TEST

Five ml. portions of each fungicidal concentration are inoculated with 0.5 ml. spore suspension of the test culture. From this mixture samples are transferred after 5, 10, and 15 minute intervals into dextrose broth subculture tubes. After 10 days incubation the tubes are examined for the presence or absence of fungal growth. The highest dilution that kills spores within 10 minutes is commonly considered as the highest dilution that could be expected to disinfect an inanimate surface contaminated with pathogenic fungi. The data which follow indicate the activity of 2-methyl-sulfinyl-6-nitrobenzothiazole.

| | Concentration, p.p.m. | Aspergillus niger (ATCC No. 6275) | Trichophyton interdigitale (ATCC No. 9533) |
|---|---|---|---|
| | 1 | +4 | +4 |
| | 10 | ± | 0 |
| | 25 | 0 | 0 |
| | 50 | 0 | 0 |
| | 100 | 0 | 0 |
| | 300 | 0 | 0 |
| | 500 | 0 | 0 |
| Endpoint, p.p.m. | | <25 | <10 |
| Acetone control | 50 | +4 | +4 |
| | 100 | +4 | +4 |
| | 500 | +3 | +4 |

NOTE.—0=no growth; ±=trace growth; 1 to 4 indicates increasing amounts of growth.

We claim:
1. The process of controlling Pathogenic bacteria and fungi which comprises applying to said pathogens an inhibiting amount of a compound having the structure:

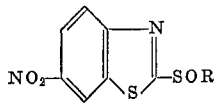

where R is alkyl containing from one to four carbon atoms.

2. The process of Claim 1 where the active agent is 2-methylsulfinyl-6-nitro-benzothiazole.

3. The process of claim 1 where the active agent is 2-butylsulfinyl-6-nitrobenzothiazole.

4. A process for controlling late blight on tomato plants which comprises applying to tomato seedings an inhibiting amount of a compound having the structure:

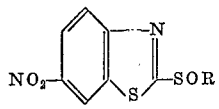

where R is alkyl containing from one to four carbon atoms.

5. A process for controlling apple scab which comprises applying to apple trees an apple scab inhibiting amount of a compound having the structure:

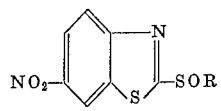

where R is alkyl containing from one to four carbon atoms.

6. A process for controlling wheat rust which comprises applying to wheat plants a wheat rust inhibiting amount of a compound having the structure:

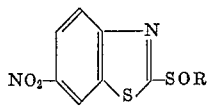

where R is alkyl containing from one to four carbon atoms.

7. A process for controlling bacteria which comprises applying an inhibiting amount of 2-methylsulfinyl-6-nitrobenzothiazole to said bacteria.

8. A process for controlling fungi which comprises applying an inhibiting amount of 2-methylsulfinyl-6-nitrobenzothiazole to said fungi.

9. The process of claim 8 wherein the fungus is *Candida albicans*.

10. The process of claim 8 wherein the fungus is *Trichophyton interdigitale*.

References Cited
UNITED STATES PATENTS

| 2,879,200 | 3/1959 | Kosmin | 424—270 |
|---|---|---|---|
| 3,163,689 | 6/1964 | Miller | 424—270 |
| 3,463,785 | 8/1969 | Buckman et al. | 424—270 X |

FOREIGN PATENTS

| 26,087 | 11/1964 | Japan | 424—270 |

OTHER REFERENCES

Chemical Abstracts, vol. 59, (1963) 8562d-g.

ALBERT T. MEYERS, Primary Examiner

N. A. DREZIN, Assistant Examiner